United States Patent [19]

Chattha

[11] 4,178,321

[45] Dec. 11, 1979

[54] HIGH SOLIDS COMPOSITION WITH HYDROXY FUNCTIONAL ACRYLIC ORGANOPHOSPHATE REACTIVE CATALYST - I

[75] Inventor: Mohinder S. Chattha, Livonia, Mich.

[73] Assignee: Ford Motor Company, Dearborn, Mich.

[21] Appl. No.: 973,326

[22] Filed: Dec. 26, 1978

[51] Int. Cl.$^2$ ............................................. C08L 63/00
[52] U.S. Cl. ........................... 525/188; 260/32.8 EP; 260/32.8 N; 260/33.6 EP; 260/33.6 UA; 260/39 M; 260/39 R; 525/481; 525/512; 525/525
[58] Field of Search ....................................... 260/834

[56] References Cited

U.S. PATENT DOCUMENTS

| | | | |
|---|---|---|---|
| 2,528,359 | 10/1950 | Greenlee | 260/834 |
| 2,528,360 | 10/1950 | Greenlee | 260/834 |
| 2,541,027 | 2/1951 | Bradley | 260/18 EP |
| 2,732,367 | 1/1956 | Shokal | 260/834 |
| 2,849,418 | 8/1958 | Fang | 260/836 |
| 3,133,838 | 5/1964 | Higgins | 260/837 R |
| 3,198,850 | 8/1965 | Levantin | 260/834 |
| 3,260,622 | 7/1966 | Suer | 526/13 |
| 3,524,903 | 8/1970 | Hargis | 260/837 R |
| 3,651,169 | 3/1972 | Davis | 260/834 |
| 3,936,416 | 2/1976 | Brady | 260/42.18 |
| 3,960,979 | 6/1976 | Khanna | 260/834 |
| 4,018,848 | 4/1977 | Khanna | 260/834 |
| 4,027,066 | 5/1977 | Victorius | 260/834 |
| 4,055,607 | 10/1977 | Sullivan | 260/834 |

*Primary Examiner*—Paul Lieberman
*Attorney, Agent, or Firm*—Roger L. May; Keith L. Zerschling

[57] ABSTRACT

A fast curing, high solids coating composition adapted for use as an automotive topcoat, which upon curing forms a hard, glossy, durable coating exhibiting excellent resistance to solvents and water. The coating composition contains greater than about 50 percent by weight of nonvolatile solids and, exclusive of pigments, solvents and other nonreactive components, consists essentially of:

(A) a copolymer bearing pendent epoxy functionality, having a number average molecular weight ($\overline{M}_n$) of between about 1500 and about 10,000 and a glass transition temperature (Tg) of between about $-25°$ and about 70° C.;

(B) a hydroxy functional acrylic organophosphate reactive catalyst;

(C) an amine aldehyde crosslinking agent; and (D) optionally, a hydroxy functional additive. The hydroxy functional acrylic organophosphate reactive catalyst is included in the composition in an amount sufficient to provide between about 0.9 and about 1.5 equivalents of acid functionality for each equivalent of pendent epoxy functionality of copolymer (A), and the amino crosslinking agent is included in the composition in an amount sufficient to provide at least about 0.4 equivalents of nitrogen crosslinking functionality for each equivalent of hydroxy functionality included in the composition.

11 Claims, No Drawings

HIGH SOLIDS COMPOSITION WITH HYDROXY FUNCTIONAL ACRYLIC ORGANOPHOSPHATE REACTIVE CATALYST - I

BACKGROUND OF THE INVENTION

This invention is related to a fast curing, high solids, thermosetting coating composition. More particularly, the invention relates to a polymeric, high solids, fast curing coating composition which is particularly adapted to provide an automotive topcoat and which demonstrates hardness, high gloss, outstanding durability and excellent resistance to solvents and water. Still more particularly, this invention relates to a fast curing, high solids, thermosetting coating composition adapted to be used as an automotive topcoat wherein the topcoat includes metallic flake as a pigment.

Because of increasingly strict solvent emissions regulations in recent years, low solvent emission paints have become very desirable. A number of high solids paint compositions have been proposed to meet these low solvent emission requirements. However, many of these compositions are deficient because of difficulty in application, slow curing rates, lack of flexibility, poor durability and low solvent and water resistance. Many of the proposed compositions have been particularly deficient as automotive topcoats, particularly when the topcoat is to include metallic flake as a pigment.

The deficiency in compositions including metallic flake results from undesired reorientation of the metallic flake during application and cure of the coating. Flake reorientation results primarily because of the very low viscosity resins used in the paint compositions to accommodate high solids. The low viscosity is not sufficient to immobilize the flakes which tend to redistribute themselves to show "reverse flop" and nonuniform distribution.

The coating compositions of this invention combine the above discussed desired properties and low application viscosity with rapid cure so as to overcome deficiencies of previously proposed high solids materials and thereby achieve a high solids coating composition particularly adapted for automotive topcoats including metallic flake as a pigment.

SUMMARY OF THE INVENTION

The thermosetting coating composition of this invention contains greater than about 50 percent by weight of nonvolatile solids, preferably greater than about 60 percent by weight, and is capable of curing rapidly at a low temperature. The composition, exclusive of pigments, solvents and other nonreactive components, consists essentially of:

(A) a copolymer bearing pendent epoxy functionality, having a number average molecular weight ($\overline{Mn}$) of between about 1500 and about 10,000, preferably between about 2,000 and about 6,000, and a glass transition temperature (Tg) of between about −25° C. and about 70° C., preferably between about −10° C. and about 50° C., the copolymer consisting of between about 10 and about 30 weight percent of monoethylenically unsaturated monomers bearing glycidyl functionality and between about 90 and about 70 weight percent of other monoethylenically unsaturated monomers;

(B) a hydroxy functional acrylic organophosphate reactive catalyst consisting essentially of the reaction product of:
   (1) a hydroxy functional acrylic copolymer which (a) has a number average molecular weight ($\overline{Mn}$) of between about 1500 and about 6,000, (b) has a glass transition temperature of between about −25° C. and about 70° C., and (c) bears between about 2 and about 10 pendent hydroxyl groups per molecule; and
   (2) sufficient phosphorus pentoxide to produce a reaction product having an acid equivalent weight of between about 500 and about 3,000;

(C) an amine aldehyde crosslinking agent; and (D) up to about 45 weight percent based on the total weight of (A), (B), (C) and (D) of a hydroxy functional additive having a number average molecular weight ($\overline{M}_n$) of between about 150 and about 6,000.

The hydroxy functional acrylic organophosphate reactive catalyst is included in the composition in an amount sufficient to provide between about 0.9 and about 1.5 equivalents, preferably between about 1.0 and about 1.2 equivalents, of acid functionality for each equivalent of pendent epoxy functionality of copolymer (A). The amino resin crosslinking agent is included in the composition in an amount sufficient to provide at least about 0.4 equivalents, preferably between about 0.6 and about 2.1 equivalents, of nitrogen crosslinking functionality for each equivalent of hydroxy functionality included in the composition either as (i) an organic hydroxyl group on the hydroxy functional acrylic organophosphate reactive catalyst, (ii) a hydroxyl group on the optional hydroxy functional additive or (iii) as a result of esterification of the pendent epoxy functionality of copolymr (A) during cure of the coating composition. In addition, the high solids coating composition of the invention may include additives such as catalysts, antioxidants, U.V. absorbers, flow control or wetting agents, antistatic agents, pigments, plasticizers, solvents, etc.

PRIOR ART

U.S. Pat. Nos. 3,960,979 and 4,018,848 to Khanna teach high solids coating compositions adapted for use as a can coating material. The compositions consist essentially of (i) aromatic epoxide compositions having two or more epoxy groups on an epoxy resin which has a molecular weight not exceeding 2500; (ii) an amino crosslinking agent; (iii) an inorganic or organic monomeric or polymeric acid which acts as a reactive catalyst; and (iv) a flexibilizing polyol.

The compositions of Khanna have the advantage of quick reaction and low application viscosity, but lack durability, and, therefore, do not weather well. This is, in part, because of the presence of ether linkages in the aromatic epoxides. As such, the compositions of Khanna are not desirable for use as automotive topcoats. The Khanna patents describe the compositions as a low cure system. However, when considering the specific teachings of the patents one finds that the composition includes an excess of epoxide resin, apparently with the purpose of "killing off" excess catalyst after completion of the curing reaction. Excess epoxy resin in the composition remains uncured at the low temperature bake range of the baking temperatures disclosed, not giving a complete cure and desirable hardness, durability or solvent resistance. If heated to higher temperatures, as called for in the examples, the excess epoxy does react with excess hydroxy functionality to give still further ether linkages. These ether linkages so obtained have a further deleterious effect on durability and make the materials particularly unsuitable for use as an automotive topcoat. Also, the necessary high bake temperatures to achieve the utilization of this excess epoxy makes the composition undesirable from an energy point of view. Still further, because the epoxy/catalyst reaction occurs in early stages of the cure, thus "killing off" the catalyst, the melamine-hydroxy curing reaction must proceed substantially without benefit of catalysis. The curing reaction thus proceeds slowly and requires the higher temperatures of the Khanna examples.

DETAILED DESCRIPTION OF THE INVENTION

The high solids coating compositions of this invention overcome disadvantages of prior art high solids compositions, including those of Khanna, to provide a system which is particularly suitable for those applications requiring high gloss, hardness, durability, and high solvent and water resistance as well as a fast cure rate at low temperatures, e.g., between about 75° C. and about 150° C., preferably between about 110° C. and about 130° C. The desirable characteristics of the coating compositions of this invention result from the carefully controlled admixture of the particular components, including a hydroxy functional acrylic organophosphate reactive catalyst, to achieve substantially complete utilization of reactant functionality and a resultant highly crosslinked coating in a fast and efficient manner.

Each of the components of the high solids coating compositions, the amounts of each of the components required to achieve the desired results of the invention and a method for applying the composition are described hereinafter in greater detail.

Epoxy Functional Copolymer

A principal material in the high solids coating compositions of this invention is an epoxy functional copolymer bearing pendent epoxy functionality, and which may be prepared by conventional free radical induced polymerization of suitable unsaturated monomers. The term "copolymer" as used herein means a copolymer of two or more different monomers.

The copolymers used in the high solids coating compositions of this invention have a number average molecular weight ($\overline{M}_n$) of between about 1500 and about 10,000, preferably between about 2,000 and about 6,000, and a glass transition temperature (Tg) of between about −25° C. and about 70° C., preferably between about −10° C. and about 50° C. The monomers used to prepare the copolymer include between about 10 and about 30 weight percent of one or more monoethylenically unsaturated monomers bearing glycidyl functionality. These monoethylenically unsaturated monomers may be glycidyl ethers or glycidyl esters. Preferably, however, the epoxy functional monomers are glycidyl esters of monoethylenically unsaturated carboxylic acids, e.g., glycidyl acrylate or glycidyl methacrylate. These monomers provide the copolymer with its pendent epoxy functionality.

The remainder of the monomers forming the epoxy functional copolymer, i.e., between about 90 and about 70 weight percent of the monomers of the copolymer, are other monoethylenically unsaturated monomers. These monoethylenically unsaturated monomers are preferably alpha-beta olefinically unsaturated monomers, i.e., monomers bearing olefinic unsaturation between the two carbon atoms in the alpha and beta positions with respect to the terminus of an aliphatic carbon-to-carbon chain.

Among the alpha-beta olefinically unsaturated monomers which may be employed are acrylates (meaning esters of either acrylic or methacrylic acids) as well as mixtures of acrylates and vinyl hydrocarbons. Preferably in excess of 50 weight percent of the total of the copolymer monomers are esters of $C_1$–$C_{12}$ monohydric alcohols and acrylic or methacrylic acids, e.g., methylmethacrylate, ethylacrylate, butylacrylate, butylmethacrylate, hexylacrylate, 2-ethylhexylacrylate, laurylmethacrylate, etc. Among the monovinyl hydrocarbons suitable for use in forming the copolymers are those containing 8 to 12 carbon atoms and including styrene, alpha-methylstyrene, vinyl toluene, t-butylstyrene and chlorostyrene. When such monovinyl hydrocarbons are employed, they should constitute less than 50 weight percent of the copolymer. Other monomers such as vinyl chloride, acrylonitrile, methacrylonitrile, and vinyl acetate may be included in the copolymer as modifying monomers. However, when employed, these modifying monomers should constitute only between about 0 and about 30 weight percent of the monomers in the copolymer.

In preparing the epoxy functional copolymer, the epoxy functional monomers and the remaining monoethylenically unsaturated monomers are mixed and reacted by conventional free radical initiated polymerization in such proportions as to obtain the copolymer desired. A large number of free radical initiators are known to the art and are suitable for the purpose. These include: benzoyl peroxide; lauryl peroxide; t-butylhydroxy peroxide; acetylcyclohexyl sulfonyl peroxide; diisobutyryl peroxide; di-(2-ethylhexyl) peroxydicarbonate; diisopropylperoxydicarbonate; t-butylperoxypivalate; decanoyl peroxide, azobis(2-methylpropionitrile), etc. The polymerization is preferably carried out in solution using a solvent in which the epoxy functional copolymer is soluble. Included among the suitable solvents are toluene, xylene, dioxane, butanone, etc. If the epoxy functional copolymer is prepared in solution, the solid copolymer can be precipitated by pouring the solution at a slow rate into a nonsolvent for the copolymer such as hexane, octane, or water under suitable agitation conditions.

The pendent epoxy functional copolymer useful in the compositions of this invention can also be prepared by emulsion polymerization, suspension polymerization, bulk polymerization, or combinations thereof, or still other suitable methods. In these methods of preparing copolymers, chain transfer agents may be required to control the molecular weight of the copolymer to a desired range. When chain transfer agents are used, care must be taken so they do not decrease the shelf stability of the composition by causing premature chemical reactions.

Hydroxy Functional Acrylic Organophosphate Reactive Catalyst

A second essential component of the high solids coatings of this invention is a hydroxy functional acrylic organophosphate reactive catalyst consisting essentially of the reaction product of:

(1) a hydroxy functional acrylic copolymer which (a) has a number average molecular weight ($\overline{M}n$) of between about 1500 and about 6000, (b) has a glass transition temperature of between about −25° C. and about 70° C., preferably between about −10° C. and about 50° C.; and (c) bears between about 2 and about 10 pendent hydroxyl groups per molecule; and (2) sufficient phosphorus pentoxide to produce a reaction product having an acid equivalent weight of between about 500 and about 3000, preferably between about 700 and about 1500.

The reaction between the hydroxy bearing acrylic copolymer and the phosphorus pentoxide is generally carried out by adding phosphorus pentoxide portionwise to the hydroxy bearing acrylic copolymer, preferably an excess of the copolymer, in a liquid state or in solution in a suitable solvent. Suitable solvents include, but are not limited to, butyl acetate, methyl ethyl ketone, methyl amyl ketone, toluene, xylene, etc.

The hydroxy bearing acrylic copolymers used in preparing the reactive catalyst, as noted above, have a number average molecular weight ($\overline{M}n$) of between about 1500 and about 6000 and a glass transition temperature of between about −25° C. and about 70° C., preferably between about −10° C. and about 50° C. These hydroxy functional copolymers are prepared by copolymerizing various monoethylenically unsaturated monomers, including at least about fifty (50) weight percent of alpha-beta olefinically unsaturated acrylate monomers. Preferred acrylate monomers, as was the case with respect to the epoxy functional copolymer discussed above, are esters of $C_1$–$C_{12}$ monohydric alcohols and acrylic or methacrylic acids, e.g., methylmethacrylate, ethylacrylate, butylacrylate, butylmethacrylate, hexylacrylate, 2-ethylhexylacrylate, laurylmethacrylate, etc.

Hydroxy functional ethylenically unsaturated monomers are included in the reaction mixture of monomers used in preparing the copolymer in sufficient amounts that the copolymer molecules formed bear between about 2 and about 10 hydroxyl groups. The long list of hydroxy functional monomers which may be employed in these hydroxy functional copolymers includes, but is not limited to, the following esters of acrylic or methacrylic acid and aliphatic alcohols: 2-hydroxyethyl acrylate; 3-chloro-2-hydroxypropyl acrylate; 2-hydroxy-1-methylethyl acrylate; 2-hydroxypropyl acrylate; 3-hydroxy-propyl acrylate; 2,3 dihydroxypropyl acrylate; 2-hydroxy-butyl acrylate; 4-hydroxybutyl acrylate; diethyleneglycol acrylate; 5-hydroxypentyl acrylate; 6-hydroxyhexyl acrylate; triethyleneglycol acrylate; 7-hydroxyheptyl acrylate; 2-hydroxymethyl methacrylate; 3-chloro-2-hydroxypropyl methacrylate; 2-hydroxy-1-methylethyl methacrylate; 2-hydroxypropyl methacrylate; 3-hydroxypropyl methacrylate; 2-hydroxypropyl methacrylate; 2,3 dihydroxypropyl methacrylate; 2-hydroxybutyl methacrylate; 4-hydroxybutyl methacrylate; 3,4 dihydroxybutyl methacrylate; 5-hydroxypentyl methacrylate; 6-hydroxyhexyl methacrylate; 1,3-dimethyl-3-hydroxybutyl methacrylate; 5,6 dihydroxyhexyl methacrylate; and 7-hydroxyheptyl methacrylate.

Although one of ordinary skill in the art will recognize that many different hydroxy bearing monomers including those listed above could be employed, the preferred hydroxy functional monomers for use in the hydroxy functional copolymer used to prepare the hydroxy functional acrylic reactive catalyst are $C_5$–$C_7$ hydroxy alkyl methacrylates, i.e., esters of $C_2$–$C_3$ dihydric alcohols and acrylic or methacrylic acids.

Other monoethylenically unsaturated monomers which may be used in preparing these copolymers are monovinyl hydrocarbons and certain modifying monomers. These monomers may comprise the remainder of the monomers making up said copolymer, other than said acrylate monomers and said hydroxy functional monomers; provided, however, that the modifying monomers should constitute only up to about 10 weight percent of the monomers in the copolymer. Exemplary of suitable monovinyl hydrocarbons are those containing 8 to 12 carbon atoms, such as styrene, alpha-methylstyrene, vinyl toluene, t-butylstyrene and chlorostyrene. Modifying monomers may include vinylchloride, acrylonitrile, methacrylonitrile and vinylacetate.

In preparing the hydroxy functional acrylic copolymer, the various monomers may be mixed and reacted by conventional free radical initiated polymerization in such proportions as to obtain the copolymer desired. This polymerization is essentially the same as that described hereinbefore with respect to preparation of the epoxy functional copolymer. Other polymerization techniques such as enumerated hereinbefore may also be used.

A preferred temperature for carrying out the reaction between the aforementioned hydroxy functional acrylic copolymer and the phosphorus pentoxide is between about 50° C. and about 60° C. Due to the multiple hydroxy functionality of the hydroxy functional acrylic copolymer, various polymeric acid phosphates and cyclophosphates are probably generated during the synthesis. All of the organophosphate derivatives so produced serve as reactive catalysts and, therefore, the entire reaction product mixture may be employed as the reactive catalyst. In those cases where an excess of the hydroxy functional acrylic copolymer is employed, that excess may serve as all or part of the optional hydroxy functional additive of the composition, as hereinafter described.

The hydroxy functional acrylic organophosphate reactive catalyst component of the high solids coating compositions of the invention allows the compositions to cure rapidly at a low temperature. The acid functionality of the organophosphate esters present in the reactive catalyst reacts with the pendent epoxy functionality of the epoxy functional copolymer to form an ester and a hydroxyl group. This hydroxyl group, as well as the organic hydroxyl groups present on the hydroxy functional acrylic organophosphate reactive catalyst and any optional hydroxy groups included in the composition in the form of hydroxy functional additive, including any hydroxy functional acrylic copolymer present from the synthesis of the hydroxy functional acrylic organophosphate reactive catalyst, crosslinks with the amino resin crosslinking agent. It is critical to achieving the preferred results of the high solids coating compositions of this invention, i.e., in making them suitable for use as automotive topcoats, that the amount of hydroxy functional acrylic organophosphate reactive catalyst be sufficient to convert substantially all of the epoxy functionality on the copolymer to the desired hydroxy functionality by esterification reaction. Therefore, the hydroxy functional acrylic organophosphate reactive catalyst is included in the composition in an amount sufficient to provide between about 0.9 and about 1.5 equivalents, preferably between about 1.0 and about 1.2 equivalents, of acid functionality for each equivalent of pendent epoxy functionality on the copolymer. As will be noted from the equivalent amounts of epoxy and hydroxy functional acrylic organophosphate acid functionality stated above, the amount of acid functionality need not be in stoichiometric amounts to the epoxy functionality. This is because of the fact that during curing of the high solids coating composition, residual water present in the composition hydrolyzes some of the esterified product back to acid and this hydrolyzed product then, in turn, reacts with additional epoxy functionality.

Amino Crosslinking Agent

A third essential component of the high solids paint compositions of this invention is an amine aldehyde crosslinking agent. Amino crosslinking agents suitable for crosslinking hydroxy functional bearing materials are well known in the art. Typically, these crosslinking materials are products of reactions of melamine, or urea with formaldehyde and various alcohols containing up to and including 4 carbon atoms. Preferably, the amino crosslinking agents useful in this invention are amine-aldehyde resins such as condensation products of formaldehyde with melamine, substituted melamine, urea, benzoguanamine or substituted benzoguanamine. Preferred members of this class are methylated melamine-formaldehyde resins such as hexamethoxymethylmelamine. These liquid crosslinking agents have substantially 100 percent nonvolatile content as measured by the foil method at 45° C. for 45 minutes. For the purposes of the invention it should be recognized that it is important not to introduce extraneous diluents that would lower the final solids content of the coating.

Particularly preferred crosslinking agents are those sold by American Cyanamid under the trademark "Cymel". In particular, Cymel 301, Cymel 303 and Cymel 1156, which are alkylated melamine-formaldehyde resins, are useful in the compositions of this invention.

The amino resin materials function as a crosslinking agent in the composition of the invention by reacting with hydroxy functionality present in the composition (i) as an organic hydroxyl group on the hydroxy functional acrylic organophosphate reactive catalyst, (ii) as a hydroxyl group on the optional hydroxy functional additive including any excess hydroxy functional acrylic copolymer from the synthesis of the hydroxyfunctional acrylic organophosphate reactive catalyst, or (iii) as a result of esterification of the pendent epoxy functionality on the epoxy functional copolymer.

In order to achieve the outstanding properties which make these coating compositions particularly useful as automotive topcoat materials, it is essential that the amount of amino crosslinking agent be sufficient to substantially completely crosslink the hydroxy functionality in the coating composition. Therefore, the amino crosslinking agent should be included in the composition in an amount sufficient to provide at least about 0.4 equivalents, preferably between about 0.6 and about 2.1 equivalents, of nitrogen crosslinking functionality for each equivalent of hydroxy functionality included in the composition.

Optional Hydroxy Functional Additive

Additional hydroxy functionality other than that achieved by esterification of pendent epoxy functionality of the epoxy functional copolymer or by the hydroxy functional acrylic organophosphate reactive catalyst may be achieved by adding a hydroxy functional additive in amounts up to about 45 weight percent based on the total of the three above discussed components and the hydroxy functional additive itself. Such a material serves to provide additional hydroxy functionality so as to provide a more intimate crosslinked structure in the final cured product. The hydroxy functional additives useful in the composition are preferably selected from various polyols have a number average molecular weight ($\overline{M}_n$) of between about 150 and about 6,000, preferably between about 400 and about 2500. As used herein the term polyol means a compound having two or more hydroxyl groups.

The polyols useful for the invention preferably are selected from the group consisting of: (i) hydroxy functional polyesters; (ii) hydroxy functional polyethers; (iii) hydroxy functional oligoesters, (iv) monomeric polyols, (v) hydroxy functional copolymers produced by free radical polymerization of monoethylenically unsaturated monomers, one or more of which bears hydroxy functionality and which is included in the copolymer in an amount ranging from about 2.5 to about 30 weight percent of the copolymer and (vi) mixtures of (i)-(v).

The hydroxy functional polyesters useful in the invention are preferably fully saturated products prepared from aliphatic dibasic acids containing 2–20 carbon atoms, such as succinic acid, glutaric acid, adipic acid, azelaic acid, etc., and short chain glycols of up to and including 21 carbon atoms, such as ethylene glycol, 1,2-propylene glycol, 1,3-propylene glycol, 1,2-butylene glycol, 1,3-butylene glycol, 1,4-butylene glycol, neopentyl glycol, 1,4-cyclohexane dimethylol, 1,6-hexamethylene glycol and 2-ethyl-2-methyl-1,3 propane diol. The molecular weight of these materials ranges from about 150 to about 3000 and the hydroxyl number ranges from about 30 to about 230. The hydroxyl number is defined as the number of milligrams of potassium hydroxide needed for each gram of sample to neutralize the acetic acid generated during the reaction between the polyol and excess acetic anhydride. The polyester polyols utilized in the invention are low melting, soft waxy solids which are easily maintained in the molten state.

Among preferred polyesters are products derived from the esterification of ethylene glycol and 1,4 butane diol with adipic acid, ethylene glycol and 1,2 propylene glycol with adipic acid, azelaic acid and sebacic acid copolyester diols, and mixtures thereof.

Among useful polyether diols are polytetramethylene ether glycol, polyethylene glycol, polypropylene glycol and the like.

The hydroxy functional oligoesters useful as hydroxy functional additives in the compositions of the invention are oligoesters preferably having a molecular weight of between about 150 and about 3000. Such oligoesters may be selected for example, from the group consisting of: (i) oligoesters prepared by reacting a dicarboxylic acid with a monoepoxide such as an alkylene oxide; (ii) oligoesters prepared by reacting a polyepoxide with a monocarboxylic acid; and (iii) oligoesters prepared by reacting a hydroxy functional monocarboxylic acid with either a mono- or polyepoxide.

The oligoester prepared by reacting a di-carboxylic acid with an alkylene oxide is a low molecular weight adduct which has a narrow molecular weight distribution when compared to similar compositions made by normal polyester manufacturing techniques. The adduct is prepared by reacting a dibasic carboxylic acid with alkylene oxides, preferably ethylene oxide or propylene oxide, in the presence of a catalyst. Preferred di-carboxylic acids are $C_6$–$C_{12}$ aliphatic acids such as adipic acid, azelaic acid, sebacic acid or dodecane dicarboxylic acid. Mixtures of these acids or mixtures of the aliphatic dicarboxylic acids with aromatic dicarboxylic acids also yield suitable hydroxy functional oligoesters.

The preparation of oligoesters from monocarboxylic acids and polyepoxides is well known and is described, for example, in U.S. Pat. Nos. 2,456,408 and 2,653,141. Numerous hydroxy functional oligoesters within this general category will be apparent to those skilled in the art.

The third type of hydroxy functional oligoester, i.e., those prepared by reaction of a hydroxy functional monocarboxylic acid with an epoxide is described in U.S. Pat. No. 3,404,018. While the epoxides employed in accordance with the teachings of that patent are polyepoxides, oligoesters may be prepared in a similar manner to that described therein by employing a monoepoxide, such as an alkylene oxide, and a hydroxy functional monocarboxylic acid as described therein. Numerous monoepoxide materials suitable for this purpose will be apparent to those skilled in the art.

Among the numerous monomeric polyols which may be employed as the hydroxy functional additive are the various short chain glycols of up to and including 21 carbon atoms which are useful in preparing the hydroxy functional polyesters discussed above. Other conventional polyhydric alcohols such as glycerols and sugar alcohols are also among the numerous monomeric polyols which will be apparent to those skilled in the art.

The hydroxy bearing copolymer useful as the hydroxy functional additive may be the same hydroxy functional acrylic copolymer used to prepare the hydroxy functional acrylic organophosphate reactive catalyst.

Other Materials

In addition to the above discussed components, other materials may be included in the high solids coating compositions of the invention. These include materials such as catalysts, antioxidants, U.V. absorbers, solvents, surface modifiers and wetting agents as well as pigments. The solvents used in the coating compositions of the invention are those which are commonly used. Typical solvents useful in the coating compositions facilitate spray application at high solids content and include toluene, xylene, methylethyl ketone, acetone, 2-ethoxy-1-ethanol, 2-butoxy-1-ethanol, diacetone alcohol, tetrahydrofuran, ethylacetate, dimethylsuccinate, dimethylglutarate, dimethyladipate or mixtures thereof. The solvent in which the epoxy functional copolymer of the coating composition is prepared, may be employed as the solvent for the coating composition; thus eliminating the need for drying the epoxy functional copolymer after preparation if such is desired. As mentioned above, the nonvolatile solids content of the high solids coating composition is at least 50 percent and preferably 60 percent or more, thus limiting the amount of solvent included in the composition.

Surface modifiers or wetting agents are common additives for liquid paint compositions. The exact mode of operation of these surface modifiers is not known, but it is thought that their presence contributes to better adhesion of the coating composition to the surface being coated and helps formation of thin coatings on surfaces, particularly metal surfaces. These surface modifiers are exemplified by acrylic polymers containing 1.1-10 percent by weight of copolymerized monoethylenically unsaturated carboxylic acids such as methacrylic acid, acrylic acid or itaconic acid, cellulose acetate butyrate, silicon oils or mixtures thereof. Of course, the choice of surface modifier or wetting agent is dependent upon the type of surface to be coated and selection of the same is clearly within the skill of the artisan.

The high solids coating composition of the invention also may include pigments. As noted above, the high solids compositions of this invention are particularly useful when the coating composition includes metallic flake as a pigment. The rapid set and curing of the composition eliminates problems associated with redistribution of the metallic flake in the composition. The amount of pigment in high solids coating composition may vary, but preferably is between about 3 and about 45 weight percent based on the total weight of the paint composition. If the pigment is metallic flake, the amount preferably ranges from about 1 to about 7 weight percent.

Application Techniques

The high solids coating composition can be applied by conventional methods known to those in the art. These methods include roller coating, spray coating, dipping or brushing and, of course, the particular application technique chosen will depend on the particular substrate to be coated and the environment in which the coating operation is to take place.

A particularly preferred technique for applying the high solids coating compositions, particularly when applying the same to automobiles as topcoats, is spray coating through the nozzle of a spray gun.

The invention will be further understood by referring to the following detailed examples. It should be understood that the specific examples are presented by way of illustration and not by way of limitation. Unless otherwise specified, all references to "parts" is intended to mean parts by weight.

EXAMPLE 1

(a) In a round-bottom four-necked flask, equipped with a stirrer, a dropping funnel, a thermometer and a condenser, 500 ml of methyl amyl ketone is brought to reflux under nitrogen. The following mixture of monomers is employed for polymer synthesis:

|  | Weight/Grams | Wt. % |
|---|---|---|
| Butyl methacrylate | 127.5 | 17 |
| Ethylhexyl acrylate | 180 | 24 |
| Glycidyl methacrylate | 195 | 26 |
| Methyl methacrylate | 210 | 28 |
| Styrene | 37.5 | 5 |

Thirty-seven (37) grams of tert-butyl perbenzoate is added to the above monomers and the resulting solution added dropwise to refluxing methyl amyl ketone over a period of 70 minutes. The heating and stirring is continued for 30 minutes after the addition is complete and then two more grams t-butyl perbenzoate are added portionwise. The reaction mixture is refluxed for two more hours and then allowed to cool to room temperature. The molecular weight of the copolymer is determined by Gel Permeation Chromatography and found to be $\overline{M}_n = 3250$ and $\overline{M}_w/\overline{M}_n = 2.2$. The calculated Tg of the polymer is 9° C. and the solution viscosity (#4 Ford cup) is 41 seconds.

(b) A hydroxy acrylic copolymer is prepared from the following monomers:

|  | Weight/Grams | Wt. % |
|---|---|---|
| Hydroxyethyl acrylate | 400 | 20 |
| Methylmethacrylate | 400 | 20 |
| Styrene | 200 | 10 |
| Butyl methacrylate | 1000 | 50 |

One hundred (100) grams tert-butyl perbenzoate is added to the above monomer mixture and the resulting solution added dropwise over a period of two hours to 1600 grams of refluxing 145° C.) methyl amyl ketone (under nitrogen). The heating and stirring is continued for half an hour after the addition is complete and then five (5) grams of tert-butyl perbenzoate are added portionwise to the reaction mixture. The reaction mixture is refluxed for an additional ninety minutes and then allowed to cool to room temperature. The molecular weight is determined by Gel Permeation Chromatography: $\overline{M}_n = 2540$, $\overline{M}_w/\overline{M}_n = 1.94$.

Calculated $T_g = 27°$ C.
Theoretical solids = 60%
Determined solids = 59.2%
Viscosity, #4 Ford Cup = 44 Sec.
Hydroxy equivalent weight = 980

Five hundred grams (500 g) of the above polymer solution are dissolved in 100 ml n-butyl acetate and the solution is heated to 60° C. Powdered $P_2O_5$ is added portionwise with continuous stirring and maintaining the temperature at 60° C. Small test portions of the reaction mixture are titrated with sodium hydroxide solution and the addition of $P_2O_5$ is continued until the acid equivalent weight reached 1564.

Seventy-five parts of the polymer solution from (a) and 64 parts of Cymel 301 are dissolved in 33 parts of n-butyl acetate and 130 parts of the reactive catalyst reaction product mixture of (b) are added to the above solution and the resulting formulation is applied by spraying to primed steel panels. The panels are baked at 140° C. for 20 minutes to obtain coatings with excellent hardness, adhesion and solvent (xylene and methyl ethyl ketone) resistance.

EXAMPLE 2

Fifty parts of the polymer solution from Example 1 (a) and 62 parts of Cymel 301 and 7 parts of aluminum flakes (65% in naphtha) are mixed with 34 parts of n-butyl acetate. Eighty-seven parts of the reactive catalyst reaction product mixture from Example 1(b) are added to the above mixture and the resulting formulation is applied by spraying in three coats to primed steel panels. The panels are baked at 100° C./10 minutes and then at 140° C./10 minutes to obtain silver metallic coatings with excellent hardness, adhesion and solvent (xylene and methyl ethyl ketone) resistance.

EXAMPLE 3

In the composition described in Example 1, 66 parts of Cymel 1156 are substituted for Cymel 301 used therein. The resulting formulation is applied by spraying to primed steel test panels which are baked at 130° C. for 20 minutes to obtain coatings with excellent hardness, adhesion and solvent (xylene and methyl ethyl ketone) resistance.

EXAMPLE 4

The following monomers are utilized in the synthesis of a glycidyl methacrylate polymer.

|  | Weight/Grams | Wt. % |
|---|---|---|
| Butyl methacrylate | 120 | 16 |
| Ethylhexyl acrylate | 142.5 | 19 |
| Glycidyl methacrylate | 195 | 26 |
| Methyl methacrylate | 255 | 34 |
| Styrene | 37.5 | 5 |

The polymerization is carried out as outlined in Example 1 by employing 500 grams of methyl amyl ketone and 30 grams of tert-butyl perbenzoate. The addition of initiator and the monomer mixture is complete in two hours and the reaction mixture refluxed for one additional hour. Two grams of initiator are then added and the reaction mixture refluxed for two hours. The molecular weight determined by Gel Permeation Chromatography is found to be $\overline{M}_n = 3168$ and $\overline{M}_w/\overline{M}_n = 2.15$. The Tg of this polymer is calculated to be 20° C.

Sixty parts of this polymer solution, 54 parts of Cymel 301, 9 parts of aluminum flakes (65% in naphtha), 41 parts of n-butyl acetate and 112 parts of the reactive catalyst reaction product mixture from Example 1(b) are added to the above mixture. The resulting formulation is applied by spraying in three coats to primed test panels which are baked at 135° C./20 minutes to obtain silver metallic coating with excellent hardness, adhesion and solvent (xylene and methyl ethyl ketone) resistance.

EXAMPLE 5

(a) The following mixture of monomers is used in the polymer synthesis:

|  | Weight% |
|---|---|
| Butyl methacrylate | 25 |
| Glycidyl acrylate | 30 |
| Methyl methacrylate | 40 |
| Styrene | 5 |

The polymerization is carried out as outlined in Example 1 to obtain a 50% solution of the polymer.

(b) A hydroxy acrylic copolymer is prepared from the following monomers:

|  | Parts by Weight |
|---|---|
| Butyl methacrylate | 26 |
| Ethylhexyl acrylate | 20 |
| Hydroxyethyl acrylate | 30 |
| Styrene | 24 |

The preparation is carried out in the same way as outlined in Example 1(b) by using cellusolve acetate as the solvent and tert-butyl peroctoate (5% of monomers) as initiator to obtain a 70% solution of the polymer. The calculated Tg is $-7°$ C. and the molecular weight from Gel Permeation Chromatography is $\overline{M}_n = 3070$ and $\overline{M}_w/\overline{M}_n = 2.2$.

Four hundred grams of this polymer solution are mixed with 100 grams of cellusolve acetate and is heated to 50° C. Thirty-five grams of phosphorus pentoxide are added portionwise (5 hours) with continuous stirring and maintaining the temperature at 60° C. After the addition is complete, the reaction mixture is heated for one hour at 60° C. and then it is filtered through a coarse filtering paper. From sodium hydroxide titration, the acid equivalent weight is found to be 786; Gel Permeation Chromatography shows its molecular weight ($\overline{M}_n$) to be 3102 (d=2.5).

Fifty parts of polymer solution (a) and 31 parts of Cymel 301 are dissolved in 18 parts of n-butyl acetate. Forty-two (42) parts of reactive catalyst reaction product mixture (b) and three parts of diol RG-82 (Eastman Kodak) are added to the above solution; the resulting formulation is applied by spraying to primed steel panels which are baked at 135° C./20 minutes to obtain hard, glossy coating with excellent adhesion and solvent (xylene and methyl ethyl ketone) resistance.

EXAMPLE 6

Sixty (60) parts of glycidyl methacrylate polymer solution from Example 1(a), 5 parts of caprolactone based hydroxy resin PCP-0300 (Union Carbide) and 31 parts of benzoguanamine resin are dissolved in 25 parts of n-butyl acetate. Fifty-two (52) parts of reactive catalyst reaction product mixture from Example 5(b) are added to the above solution and the resulting formulation is applied by spraying to primed steel panels. The panels are baked at 135° C. for 20 minutes to obtain coatings with excellent hardness, adhesion and solvent (xylene and methyl ethyl ketone) resistance.

EXAMPLE 7

Fifty parts of glycidyl methacrylate polymer solution from Example 1(a), 5 parts of hydroxypropyl bis-(azelate) and 29 parts of glycoluril resin (Cymel 1170) are dissolved in 20 parts of n-butyl acetate. Forty-four (44) parts of reactive catalyst reaction product mixture from Example 5(b) are added to the above solution and the resulting formulation is applied by spraying to primed steel panels. The panels are baked at 140° C./20 minutes to obtain coating with excellent physical properties.

EXAMPLE 8

Seventy (70) parts of glycidyl methacrylate polymer solution from Example 1(a) are mixed with 52 parts of urea resins, Beetle 80 (American Cyanamid), 10 parts of Acryloid OL-42 (Rohm and Haas Chem. Co.), 27 parts of n-butyl acetate and 60.5 parts of reactive catalyst reaction product mixture from Example 5(b). The resulting formulation is applied by spraying in three coats to primed steel panels which are baked at 140° C. for 20 minutes to obtain coatings with excellent hardness, adhesion and solvent (xylene and methyl ethyl ketone) resistance.

EXAMPLE 9

The following mixture of monomers is employed in the synthesis of a polymer:

|  | Weight % |
|---|---|
| Allyl glycidyl ether | 30 |
| Butyl methacrylate | 25 |
| Methyl methacrylate | 30 |
| Styrene | 15 |

The polymerization is carried out as outlined in Example 1 to obtain a 52% solution of the polymer in methyl amyl ketone. Fifty-five (55) parts of this polymer solution and 27 parts of Cymel 301 are dissolved in 23 parts of n-butyl acetate and 60.2 parts of reactive catalyst reaction product mixture from Example 5(b) are added to this solution. The resulting formulation is applied by spraying to primed steel panels which are baked at 140° C./20 minutes to obtain a coating with excellent hardness, adhesion and solvent (xylene and methyl ethyl ketone) resistance.

EXAMPLE 10

The following monomers are employed in the synthesis of this polymer.

|  | Weight % |
|---|---|
| Butyl methacrylate | 40 |
| Glycidyl methacrylate | 15 |
| Methyl methacrylate | 40 |
| Styrene | 5 |

The polymerization is carried out in methyl amyl ketone by employing 1.8% (by wt. of the monomers) of the initiator. The molecular weight from Gel Permeation Chromatography is found to to be $\overline{M}_n=5750$, $\overline{M}_w/\overline{M}_n=2.4$. The solids content is found to be 54% by weight.

Three hundred fifty (350) grams of titanium dioxide is mixed with 350 grams of Acryloid OL-42 (Rohm and Hass Chem. Co.) and 25 ml of n-butyl acetate. This mixture is ground in a a pebble mill for 16 hours.

Fifty (50) parts of this mill base are mixed with 26 parts of the above polymer solution, 17 parts of Cymel 301 and 16 parts of n-butyl acetate. Reactive catalyst mixture (12.7 parts) from Example 5(b) is added to the above mixture and the resulting formulation is applied by spraying to primed steel panels. The panels are baked at 135° C. for 20 minutes to obtain coatings with excellent gloss, hardness, adhesion and solvent (xylene and methyl ethyl ketone) resistance.

In view of this disclosure, many modifications of this invention will be apparent to those skilled in the art. It is intended that all such modifications which fall within the true scope of this invention be included within the terms of the appended claims.

I claim:

1. A thermosetting coating composition adapted for low temperature bake applications which contains greater than about 50% by weight of nonvoltile solids, and which, exclusive of pigments, solvents and other nonreactive components, consists essentially of:
  (A) a copolymer bearing pendant epoxy functionality, having a number average molecular weight ($\overline{M}_n$) of between about 1500 and about 10,000 and a glass transition temperature (Tg) of between about −25° C. and about 70° C., said copolymer consisting of between about 10 and about 30 weight percent of monoethylenically unsaturated monomers bearing glycidyl functionality and between about 90 and about 70 weight percent of other monoethylenically unsaturated monomers;
  (B) a hydroxy functional acrylic organophosphate reactive catalyst consisting essentially of the reaction product of:
    (1) a hydroxy functional acrylic copolymer which (a) has a number average molecular weight ($\overline{M}n$) of between about 1500 and about 6000, (b) has a glass transition temperature of between about −25° C. and about 70° C., and (c) bears between about 2 and about 10 pendent hydroxy groups per molecule; and (2) sufficient phosphorus pentoxide to produce a reaction product having an acid equivalent weight of between about 500 and about 3000;

(C) an amine-aldehyde crosslinking agent; and (D) up to 45 weight percent based on the total weight of (A), (B), (C), and (D) of a hydroxy functional additive having a number average molecular weight ($\overline{M}_n$) of between 150 and about 6000, said hydroxy functional acrylic organophosphate ester being included in said composition in an amount sufficient to provide between about 0.8 and about 1.5 equivalents of acid functionality for each equivalent of pendent epoxy functionality on said copolymer, and said amine aldehyde crosslinking agent being included in said composition in an amount sufficient to provide at least about 0.4 equivalents of nitrogen crosslinking functionality for each equivalent of hydroxy functionality included in said composition either as (i) an organic hydroxyl group on said hydroxy functional acrylic organophosphate reactive catalyst, (ii) a hydroxyl group on said hydroxy functional additive, or (iii) as a result of esterification of said pendent epoxy functionality of said copolymer during cure of said coating composition.

2. A composition in accordance with claim 1, wherein said monoethylenically unsaturated monomers bearing glycidyl functionality are selected from glycidyl esters and glycidyl ethers.

3. A composition in accordance with claim 2, wherein said monoethylenically unsaturated monomers bearing glycidyl functionality are selected from glycidyl esters of monoethylenically unsaturated carboxylic acids.

4. A composition in accordance with claim 1, wherein said other monoethylenically unsaturated monomers in said copolymer are selected from the group consisting of acrylates and other monoethylenically unsaturated vinyl monomers.

5. A composition in accordance with claim 4, wherein said acrylate monomers comprise at least about 50 weight percent of the total monomers in said copolymer and are selected from esters of $C_1$-$C_{12}$ monohydric alcohols and acrylic or methacrylic acids.

6. A composition in accordance with claim 1, wherein said hydroxy functional acrylic copolymer used to prepare said hydroxy functional acrylic organophosphate reactive catalyst is a copolymer prepared from at least about 50 weight percent of acrylate monomers and sufficient hydroxy functional monoethylenically unsaturated monomers to provide the desired hydroxy functionality.

7. A composition in accordance with claim 6, wherein said copolymer has a glass transition temperature of between about $-10°$ C. and about $50°$ C. and is prepared from at least about 50 weight percent of acrylate monomers, sufficient hydroxy functional monoethylenically unsaturated monomers to provide the desired hydroxy and a remainder of monomers selected from $C_8$-$C_{12}$ monovinyl hydrocarbons and vinyl modifying monomers, said vinyl modifying monomers comprising less than 10 weight percent of the monomers in said copolymer.

8. A composition in accordance with claim 1, wherein said hydroxy functional acrylic organophosphate reactive catalyst is the reaction product of an excess of hydroxy functional acrylic copolymer and phosphorus pentoxide.

9. A composition in accordance with claim 1, wherein said amine-aldehyde crosslinking agent selected from the group consisting of condensation products of formaldehyde with melamine, substituted melamine, urea, benzoguanamine and substituted benzoguanamine, and mixtures of said condensation products and is included in an amount sufficient to provide between about 0.6 and about 2.1 equivalents of nitrogen crosslinking functionality per equivalent of hydroxy functionality.

10. A composition in accordance with claim 1, wherein said hydroxy functional additive is a polyol selected from the group consisting of (i) hydroxy functional polyesters, (ii) hydroxy functional polyethers, (iii) hydroxy functional oligoesters, (iv) monomeric polyols, (v) hydroxy functional copolymers formed from monoethylenically unsaturated monomers, one or more of which bears hydroxy functionality and which is included in said copolymer in amounts ranging from about 2.5 to about 30 weight percent of said copolymer, and (vi) mixtures of (i)-(v).

11. A composition in accordance with claim 1, wherein said hydroxy functional acrylic organophosphate reactive catalyst is included in said composition in an amount sufficient to provide between about 1.0 and about 1.2 equivalents of acid functionality for each equivalent of pendent epoxy functionality on said copolymer.

* * * * *